(12) United States Patent
Tian

(10) Patent No.: US 11,036,953 B2
(45) Date of Patent: Jun. 15, 2021

(54) IMAGE PROCESSING METHOD, ELECTRONIC DEVICE AND STORAGE MEDIUM

(71) Applicant: Lenovo (Beijing) Co., Ltd., Beijing (CN)

(72) Inventor: Xingfa Tian, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/730,077

(22) Filed: Dec. 30, 2019

(65) Prior Publication Data

US 2020/0210674 A1 Jul. 2, 2020

(30) Foreign Application Priority Data

Dec. 30, 2018 (CN) .......................... 201811648579.7

(51) Int. Cl.
G06K 9/00 (2006.01)
G09G 5/18 (2006.01)

(52) U.S. Cl.
CPC ..... G06K 9/00013 (2013.01); G06K 9/00093 (2013.01); G09G 5/18 (2013.01); G06K 2009/0006 (2013.01); G09G 2320/0646 (2013.01); G09G 2320/0653 (2013.01)

(58) Field of Classification Search
CPC .......... G06K 9/00013; G06K 9/00093; G06K 2009/0006; G09G 5/18; G09G 2320/0646; G09G 2320/0653
See application file for complete search history.

(56) References Cited

U.S. PATENT DOCUMENTS

2006/0284996 A1 12/2006 Kanai et al.
2012/0313913 A1* 12/2012 Shiraki ................. G06F 3/0412
345/207
2019/0102016 A1* 4/2019 Kim ........................ G06K 9/22

FOREIGN PATENT DOCUMENTS

| CN | 107421466 A | 12/2017 |
| CN | 108037132 A | 5/2018 |
| CN | 108806627 A | 11/2018 |

* cited by examiner

Primary Examiner — Stephen G Sherman
(74) Attorney, Agent, or Firm — Anova Law Group, PLLC

(57) ABSTRACT

Image processing method, electronic device, and storage medium are provided. The method includes acquiring an image through an image acquisition component. The image acquisition component and a display screen are arranged one over another. The image acquisition component includes an acquisition area, and the acquisition area corresponds to an input area on a display area of the display screen. Based on a synchronization signal that is at least synchronized with a signal of brightness decrease of the input area on the display area of the display screen, image acquisition of the image acquisition component is suspended.

15 Claims, 7 Drawing Sheets

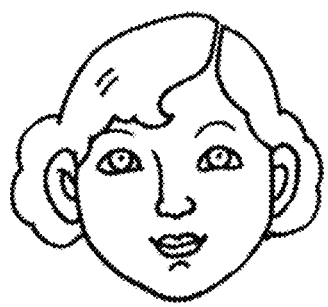
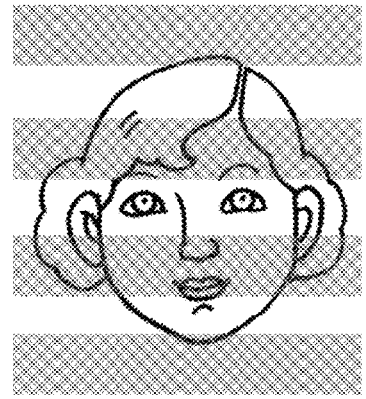
Figure 8a    Figure 8b
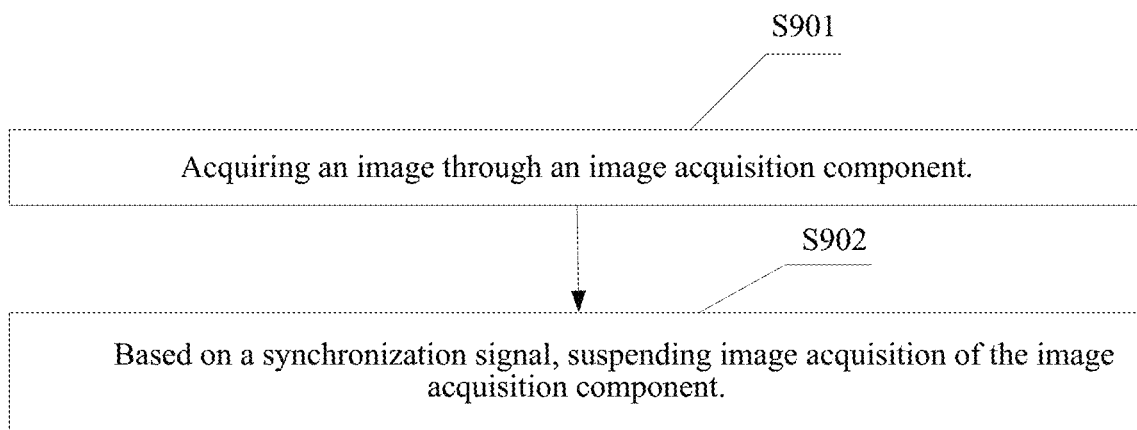
Figure 9

IMAGE PROCESSING METHOD, ELECTRONIC DEVICE AND STORAGE MEDIUM

CROSS-REFERENCES TO RELATED APPLICATIONS

This application claims priority of Chinese Patent Application No. 201811648579.7, filed on Dec. 30, 2018, the entire content of which is hereby incorporated by reference.

FIELD OF THE DISCLOSURE

The present disclosure generally relates to the field of image processing technology and, more particularly, relates to an image processing method, an electronic device, and a readable storage medium.

BACKGROUND

An electronic device may have a function of image acquisition, for example, acquisition of a fingerprint image. However, images acquired by a conventional electronic device may have inconsistent brightness, for example, light and dark stripes may appear in the images.

SUMMARY

One aspect of the present disclosure includes an image processing method. The method includes acquiring an image through an image acquisition component. The image acquisition component and a display screen are arranged one over another. The image acquisition component includes an acquisition area, and the acquisition area corresponds to an input area on a display area of the display screen. Based on a synchronization signal that is at least synchronized with a signal of brightness decrease of the input area on the display area of the display screen, image acquisition of the image acquisition component is suspended.

Another aspect of the present disclosure includes an electronic device. The electronic device includes a memory, storing program instructions; and a processor, coupled to the memory and, when the program instructions being executed, configured to acquire an image through an image acquisition component. The image acquisition component and a display screen are arranged one over another. The image acquisition component includes an acquisition area, and the acquisition area corresponds to an input area on a display area of the display screen. Based on a synchronization signal that is at least synchronized with a signal of brightness decrease of the input area on the display area of the display screen, image acquisition of the image acquisition component is suspended.

Another aspect of the present disclosure includes a non-transitory computer readable storage medium, containing program instructions and configured, when the program instructions being executed, for a computer to perform a method. The method includes acquiring an image through an image acquisition component. The image acquisition component and a display screen are arranged one over another. The image acquisition component includes an acquisition area, and the acquisition area corresponds to an input area on a display area of the display screen. Based on a synchronization signal that is at least synchronized with a signal of brightness decrease of the input area on the display area of the display screen, image acquisition of the image acquisition component is suspended.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 8a illustrates an example image of a person in an external ambient according to some embodiments of the present disclosure;

FIG. 8b illustrates an example image of a person with light and dark stripes acquired by an image acquisition component;

FIG. 9 illustrates a flowchart of an implementation of an image processing method according to some embodiments of the present disclosure;

DETAILED DESCRIPTION

To make the objectives, technical solutions and advantages of the present disclosure more clear and explicit, the present disclosure is described in further detail with accompanying drawings and embodiments. It should be understood that the specific example embodiments described herein are only for explaining the present disclosure and are not intended to limit the present disclosure.

Reference will now be made in detail to example embodiments of the present disclosure, which are illustrated in the accompanying drawings. Wherever possible, the same reference numbers will be used throughout the drawings to refer to the same or like parts.

It should be noted that relative arrangements of components and steps, numerical expressions and numerical values set forth in example embodiments are for illustration purpose only and are not intended to limit the present disclosure unless otherwise specified. Techniques, methods and apparatus known to the skilled in the relevant art may not be discussed in detail, but these techniques, methods and apparatus should be considered as a part of the specification, where appropriate.

An electronic device may have a function of image acquisition, for example, acquisition of a fingerprint image. However, images acquired by a conventional electronic device may have inconsistent brightness, for example, light and dark stripes may appear in the images.

Figure 1:
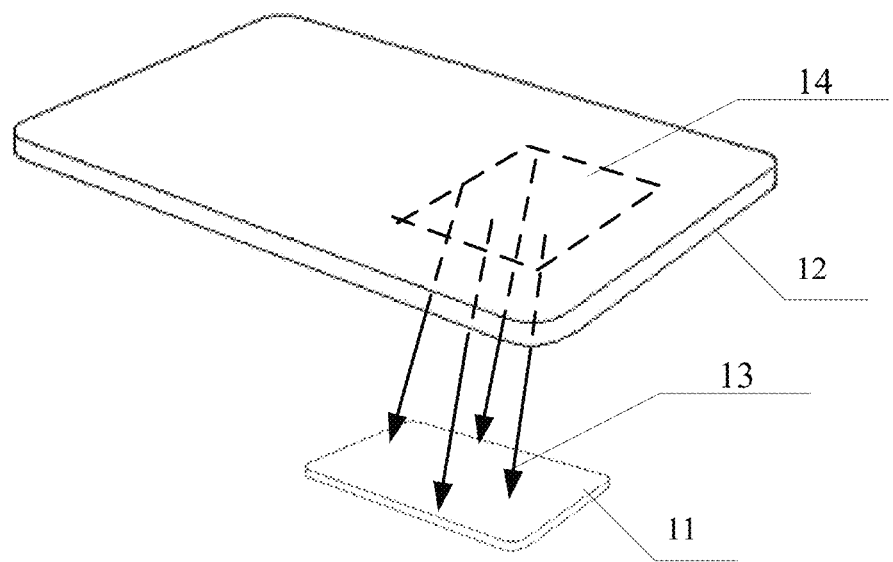
FIG. 1 illustrates a structural diagram of an electronic device according to some embodiments of the present disclosure.

FIG. 1 illustrates a structural diagram of an implementation of an electronic device according to some embodiments of the present disclosure. As shown in FIG. 1, the electronic device includes an image acquisition component 11 and a display screen 12. The image acquisition component 11 and the display screen 12 are arranged in a stacked way. For example, the image acquisition component 11 may be disposed below the display screen 12. The image acquisition component 11 includes an acquisition area 13. The acquisition area 13 corresponds to an input area 14 (framed by a dotted frame in FIG. 1) in a display area of the display screen 12.

FIG. 1 shows an example position of the input area 14 of the display screen 12 in the display area. The present application does not limit a position and a size of the input area 14 in the display area. The input area 14 may be located anywhere in the display area. A specific position of the input area 14 in the display area may be determined based on relative positions between the acquisition area 13 of the image acquisition component 11 and the display screen 12.

The input area 14 corresponds to the acquisition area 13 of the image acquisition component 11. That is, light corresponding to the input area 14 (as shown in FIG. 1) may be incident on the acquisition area 13 of the image acquisition component 11, such that the image acquisition component 11 may acquire an image.

The acquisition area 13 of the image acquisition component 11 may include at least a part area on a side of the image acquisition component 11 close to the display screen 12.

An electronic device provided by the present disclosure may be an electronic device with a display screen, such as a smart phone or PAD, a desktop computer, a notebook computer, a smart TV, or the like.

The display screen 12 of the electronic device may refresh every preset time. The present disclosure provides but does not limit a refreshing method.

Figure 2:
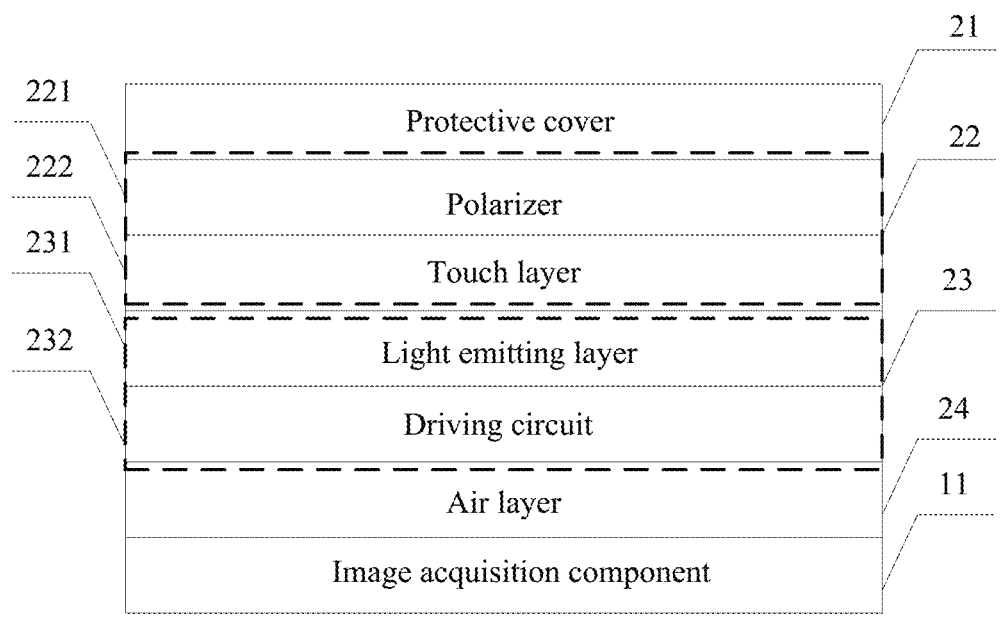
FIG. 2 illustrates a structural diagram of a display screen according to some embodiments of the present disclosure.

Before describing the refreshing method of the display screen 12, a structure of the display screen 12 is described. FIG. 2 illustrates a structural diagram of an implementation of a display screen according to some embodiments of the present disclosure. FIG. 2 is an example only and does not limit a structure of the display screen 12.

As shown in FIG. 2, the display screen includes a protective cover 21, an upper glass substrate 22, and a lower glass substrate 23. The upper glass substrate 22 includes a polarizer 221 and a touch layer 222. The lower glass substrate 23 includes a light emitting layer 231 and a driving circuit 232. An air layer 24 is located between the display screen 12 and the image acquisition component 11.

The touch layer 222 may be used to detect whether an operation body (for example, a user's finger) touches the input area 14 of the display area. The driving circuit 232 may be used to drive a light emitting element included in the light emitting layer 231 to emit light. The polarizer 221 may be used to reduce loss of light emitted by the light emitting layer, such that the light emitted by the light emitting layer may reach the protective cover as much as possible.

In one embodiment, to reduce power consumption of the display screen, the display screen is not always in a lighted state. A human eye has visual inertia. That is, once a light image is formed on a retina, vision may maintain a perception of the light image for a limited time. This physiological phenomenon is called persistence of vision. If a refreshing rate of the display screen is fast enough, and a fixed position is not always in a non-lighted state, a user's eyes may feel that a display area of the display screen is in a lighted state.

In the present disclosure, refreshing of a display screen refers to a case that the display screen is not always in a lighted state. A refreshing method of the display screen includes but is not limited to the following two methods.

In a first refreshing method, the display screen displays at least two frames of output images at intervals, for example, a first output image and a second output image. For the first output image and the second output image, one of the output images is entirely a black area, and the other output image is entirely a non-black area.

If the display screen, when displaying the first output image, corresponds to a high-level signal of the driving signal, the first output image is entirely a non-black area. If the display screen, when displaying the second output image, corresponds to a lower-level signal in the driving signal, the second output image is entirely a black area.

For example, an electric potential of the driving signal output by the driving circuit 232 may drop every preset time, such that the light-emitting element may not emit light or may emit weak light. Accordingly, brightness of the output image of the display screen may be reduced from high brightness to low brightness.

In the following description, as an example, a refreshing rate of the display screen is approximately 60 Hz, and correspondingly, a refreshing cycle of the display screen is approximately 16.67 ms.

Figure 3A:
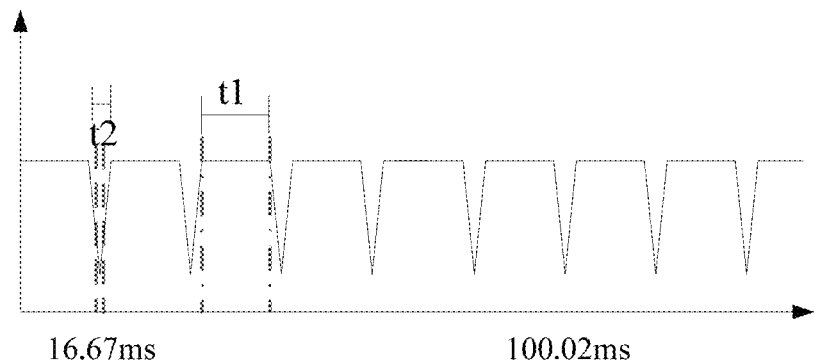
FIG. 3a illustrates a schematic diagram of a driving signal output by a driving circuit for driving a light-emitting element of a light-emitting layer to emit light according to some embodiments of the present disclosure.

FIG. 3a illustrates a schematic diagram of an implementation of a driving signal output by a driving circuit for driving a light-emitting element of a light-emitting layer to emit light according to some embodiments of the present disclosure. In FIG. 3a, an abscissa is time t, and an ordinate is voltage amplitude.

As shown in FIG. 3a, a cycle of the driving signal output by the driving circuit is approximately 16.67 ms. In one cycle, if the driving signal is in a stage t1, the driving circuit may drive the light-emitting element of the light-emitting layer to emit strong light, such that the output image displayed on the display screen may have high brightness. If the driving signal is in a stage t2, the driving circuit may drive the light-emitting element of the light-emitting layer to emit weak light, or even not to emit light, such that the output image displayed on the display screen may have low brightness.

Figure 3B:
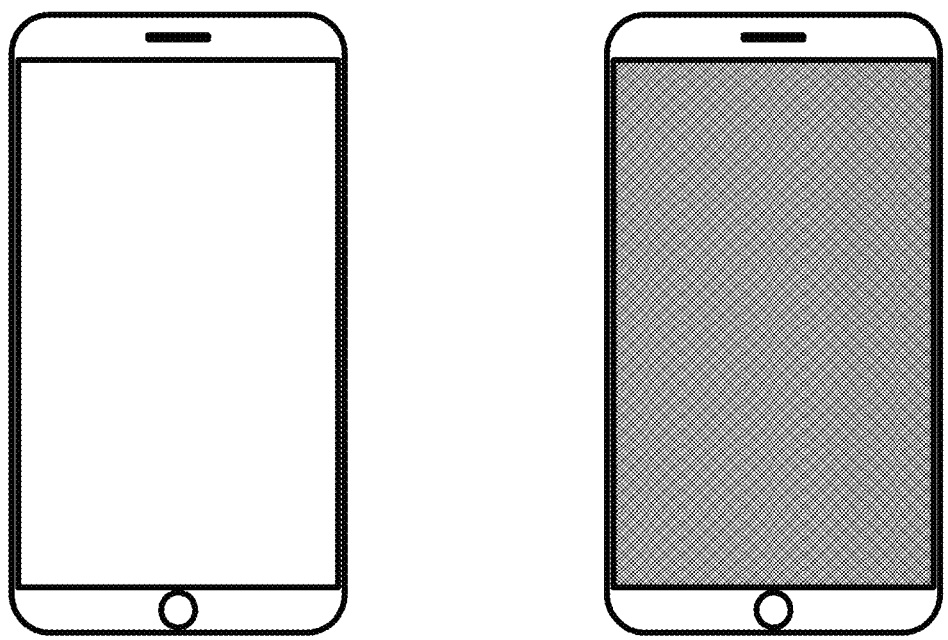
FIG. 3b illustrates a schematic diagram of brightness change of a display screen under the driving signal illustrated in FIG. 3a, according to some embodiments of the present disclosure.

FIG. 3b illustrates a schematic diagram of brightness change of a display screen under the driving signal illustrated in FIG. 3a. In one cycle, if the driving signal is at the stage t1 shown in FIG. 3a, the first output image displayed on the display screen may have high brightness as shown on a left side of FIG. 3b, and the first output image may not include a black area. If the driving signal is at the stage t2 shown in FIG. 3a, the second output image displayed on the display screen may have low brightness as shown on a right side of FIG. 3b, and the second output images may be entirely a black area. In FIG. 3b, as an example, the electronic device is a smart phone.

With reference to FIG. 3a and FIG. 3b, during an image acquisition process of the image acquisition component 11, the display screen may display the first output image and the second output image at intervals. Accordingly, during a process of acquiring one single image, the image acquisition component 11 may acquire the image both when the input area 14 of the display screen is at a black area and when the input area 14 of the display screen is at a non-black area. As such, light and dark stripes may appear in the image acquired by the image acquisition component.

In a second refreshing method, the display screen 12 may display at least two frames of output images at intervals, and each output image includes at least one non-black area and at least one black area. In one embodiment, the non-black areas and the black areas in an output image are displayed at intervals.

It may be understood that if a fixed area in the display area of the display screen is always located in a black area, due to persistence of vision, since a plurality of output images may be superimposed, a user may feel that the fixed area on the display screen is a black area. To make a display effect of the display screen unaffected, a fixed area of the display screen may not always be in the black area. Accordingly, the driving signal needs to be adjusted, such that, in one cycle, the driving signal may make the black area to scroll as frames of images are switched. In this way, due to persistence of vision, a user may not observe that the fixed area is a black area.

In one embodiment, a black area in an output image displayed on the display screen corresponds to a lower-level signal in the driving signal. That is, the light-emitting element of the light-emitting layer corresponding to the black area in the output image displayed on the display screen may emit weak light or may not emit light.

In one embodiment, a non-black area in an output image displayed on the display screen corresponds to a high-level signal in the driving signal. That is, the light-emitting element of the light-emitting layer corresponding to the non-black area in the output image displayed on the display screen may emit strong light.

In the following, as an example, four frames of output images are displayed at intervals on the display screen. Among the four frames of output images, positions of black areas included in two adjacent frames of output images in the display area are different.

Figures 4A, 4B, 4C, 4D:
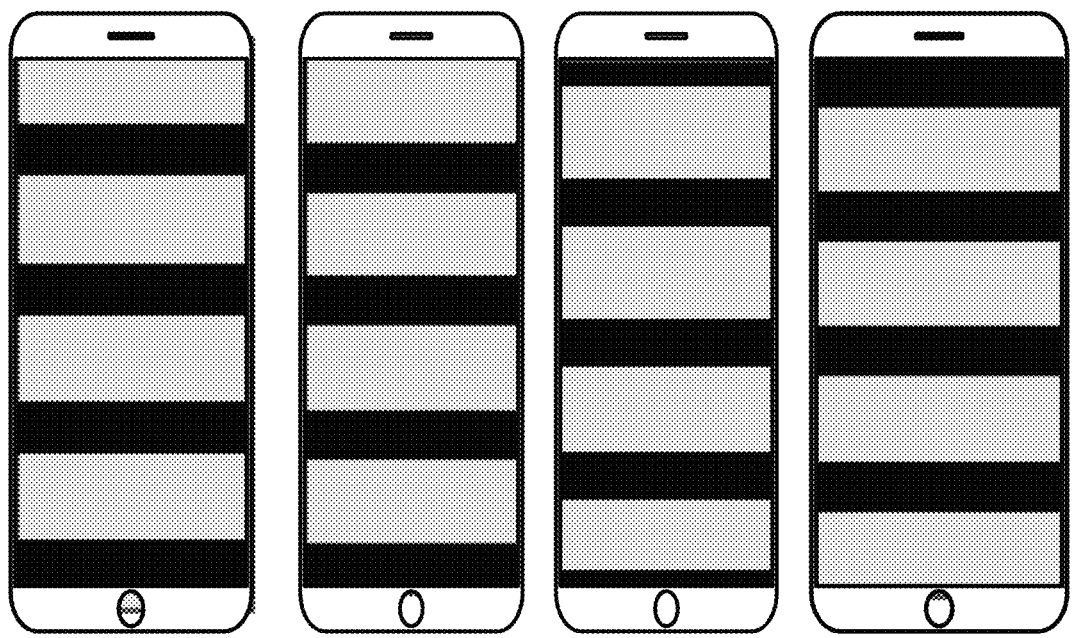
FIGS. 4a to 4d illustrate four frames of output images according to some embodiments of the present disclosure.

FIG. 4a is a schematic diagram of a first frame of output image. FIG. 4b is a schematic diagram of a second frame of output image. FIG. 4c is a schematic diagram of a third frame of output image. FIG. 4d is a schematic diagram of a fourth frame of output image.

Through FIG. 4a to FIG. 4d, visually, by scrolling down the first frame of output image shown in FIG. 4a, the second frame of output image shown in FIG. 4b may be obtained. By scrolling down the second frame of output image shown in FIG. 4b, the third frame of output image shown in FIG. 4c may be obtained. By scrolling down the third frame of output image shown in FIG. 4c, the fourth frame of output image shown in FIG. 4d may be obtained.

In one embodiment, a reason for visual scrolling of FIGS. 4a to 4d is that the driving signal scrolls along with switching of the frames of output images.

In the present disclosure, the display screen may be an active-matrix organic light-emitting diode (AMOLED) display screen. The AMOLED display screen usually use an EMIT dimming mode to reduce a lighting range within a frame of output image in the display screen.

Specifically, since a thin film transistor (TFT) in the AMOLED display screen may have a hysteresis effect, to reduce power consumption of the display screen, each frame of output image displayed in the AMOLED display screen may include a black area and a non-black area. Through a driving signal, such as a pulse width modulation (PWM) signal, the display area may be controlled to light according to a certain duty ratio, and the output images shown in FIGS. 4a to 4d may be obtained.

In one embodiment, if the driving signal output from the driving circuit to the light-emitting element of the light-emitting layer is a lower-level signal, an area corresponding to the display area of the display screen is a black area.

During an image acquisition process of the image acquisition component 11, since the output image displayed on the display screen may have light and dark stripes, an image acquired by the image acquisition component 11 may also have light and dark stripes.

The image processing method provided by the present disclosure may be applied to following application scenarios. The present disclosure may provide but are not limited to the following two application scenarios.

Figure 5:
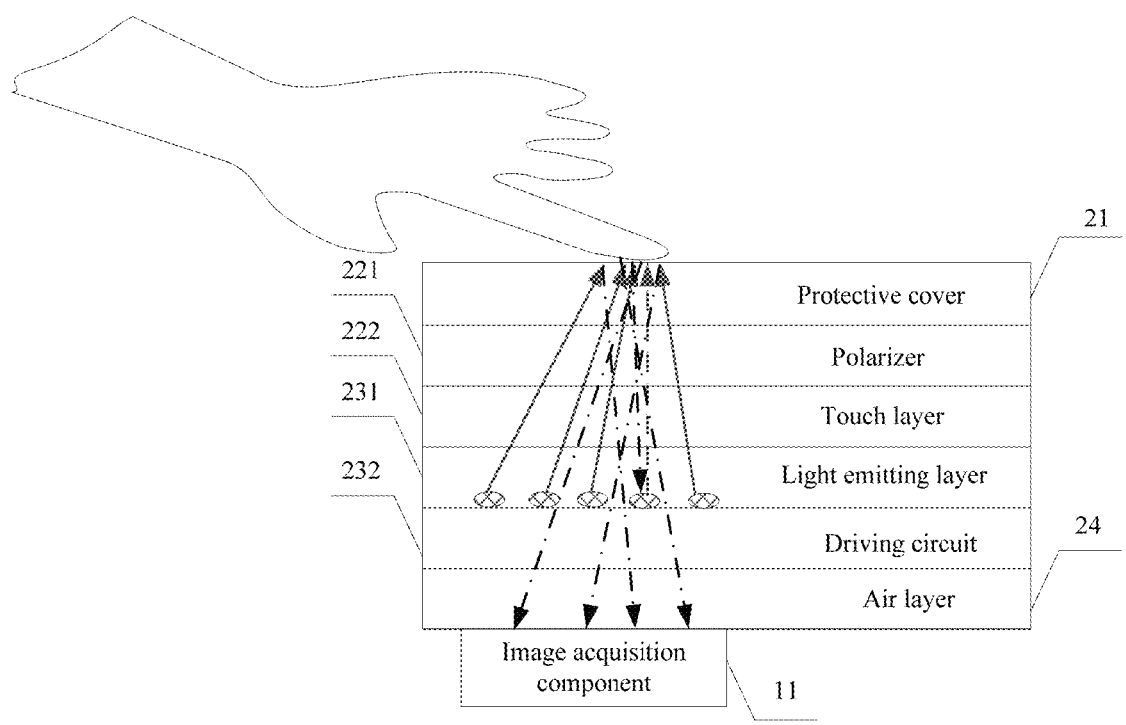
FIG. 5 illustrates a schematic diagram of light transmission of fingerprint acquisition according to some embodiments of the present disclosure.

In a first application scenario, the image acquisition component is used to acquire a fingerprint image. A user may place a finger in the input area 14 of the display screen 12. The light-emitting element in the display screen may emit light, and the light may be projected on the finger of the user. Resulting reflected light may be projected onto the acquisition area 13 of the image acquisition component, such that the image acquisition component may acquire a fingerprint image. FIG. 5 illustrates a schematic diagram of light transmission of fingerprint acquisition according to some embodiments of the present disclosure.

In one embodiment, the touch layer may be used to detect whether an operation body (for example, a user's finger) touches the input area 14 of the display area. If the operation body touches the input area 14 of the display area, a signal may be sent to the processor. After the processor receives the signal, an instruction instructing the image acquisition component to acquire an image may be generated and sent to the image acquisition component. If it is detected that no operation body touches the input area 14 of the display area, a signal may be sent to the processor. After receiving the signal, the processor may generate an instruction instructing the image acquisition component to stop acquiring images and send the instruction to the image acquisition component.

In FIG. 5, a light-emitting unit of the light-emitting layer is represented by an ellipse, and incident light emitted by the light-emitting unit is represented by a solid line. It may be understood that the incident light emitted by the light emitting unit may be refracted and/or reflected during a process of passing through the touch layer, the polarizer, and the protective cover. FIG. 5 is only a schematic diagram of light transmission showing general transmission paths only, while a detailed transmission process of the light is not shown.

After the incident light emitted from the light-emitting unit of the light-emitting layer is projected to a user's finger, reflected light may be generated. In FIG. 5, dot-dash lines indicate the reflected light of the incident light. It may be understood that when the reflected light passes through the protective cover, the polarizer, the touch layer, and the light emitting layer, the light may be reflected or refracted. When the reflected light passes through the air layer, diffuse reflection may occur. FIG. 5 is only a schematic diagram of light paths, while a detailed transmission process of the light is not shown.

It may be seen from FIG. 5 that there are gaps between the light emitting units of the light emitting layer, and the reflected light may be projected through the gaps to the acquisition area 13 of the image acquisition component. Accordingly, a fingerprint image may be acquired in the acquisition area 13.

Figures 6A, 6B:
FIG. 6a illustrates an example fingerprint image according to some embodiments of the present disclosure.
FIG. 6b illustrates an example fingerprint image with light and dark stripes acquired by an image acquisition component.

FIG. 6*a* illustrates an example fingerprint image according to some embodiments of the present disclosure. FIG. 6*b* illustrates an example fingerprint image with light and dark stripes acquired by an image acquisition component. Fingerprint recognition may be performed based on the image shown in FIG. 6*b*. The light and dark stripes on the fingerprint image shown in FIG. 6*b* may decrease a signal-to-noise ratio (SNR) of the fingerprint image and increase a false reject rate (FRR) of the fingerprint image.

In a second application scenario, the image acquisition component is used to acquire an image of an external ambient. Light of the external ambient may be projected to the acquisition area 13 of the image acquisition component 11 through the input area 14 of the display screen 12. Accordingly, the image acquisition component 11 may acquire the image of the external ambient.

Figure 7:
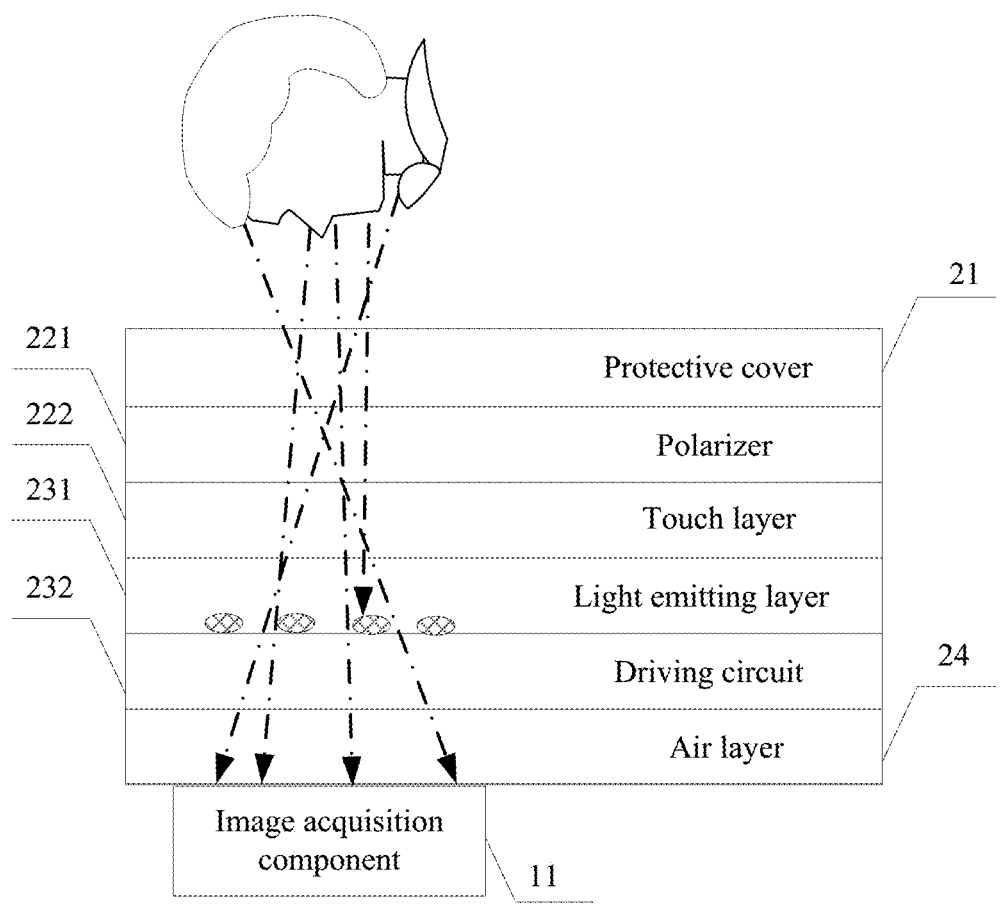
FIG. 7 illustrates a schematic diagram of transmission paths of external ambient light according to some embodiments of the present disclosure.

FIG. 7 illustrates a schematic diagram of transmission paths of external ambient light according to some embodiments of the present disclosure. As shown in FIG. 7, light from the external ambient may enter the acquisition area of the image acquisition component through the input area 14 of the display area. It may be understood that, during a process of the light from the external ambient passing through the protective cover, the polarizer, the touch layer, the light-emitting layer, and the air layer, refraction or reflection or diffuse reflection may occur. FIG. 7 is only a schematic diagram of transmission paths of the external ambient light, while detailed transmission paths of refraction, reflection, and diffuse reflection of the light are not shown.

It may be seen from FIG. 7 that the light from the external ambient also passes through the light emitting layer during a process of being projected onto the acquisition area of the image acquisition component.

FIG. 8*a* illustrates an example image of a person in an external ambient according to some embodiments of the present disclosure. FIG. 8*b* illustrates an example image of a person with light and dark stripes acquired by an image acquisition component. As shown in FIG. 8*b*, due to the light and dark stripes, the image acquired by the image acquisition component includes noise, and a clear image of the external ambient may not be obtained.

In the image processing method provided by the present application, the image acquisition component may acquire images when the output image displayed on the display screen is entirely a non-black area, or when the input area 14 of the display screen does not include a non-black area. In other cases, the image acquisition may be suspended, such that images with light and dark stripes may not appear.

In one embodiment, the image processing method provided by the present application is applied to a driving circuit in a display screen or a processor in an electronic device.

The image processing method provided by the present disclosure is described above with reference to FIG. 1 to FIG. 8*b*. The image processing method provided by the present disclosure may be applied to a driving circuit in a display screen, or a processor in an electronic device, or an image acquisition component in an electronic device.

FIG. 9 illustrates a flowchart of an implementation of an image processing method according to some embodiments of the present disclosure. As shown in FIG. 9, the image processing method includes Step S901 and Step S902.

S901: acquiring an image through an image acquisition component.

S902: based on a synchronization signal, suspending image acquisition of the image acquisition component.

The image acquisition component and the display screen may be arranged in a stacked way. The image acquisition component includes an acquisition area. The acquisition area corresponds to an input area on a display area of the display screen. The synchronization signal is at least synchronized with a signal of brightness decrease of an input area on the display area of the display screen, corresponding to the acquisition area. The image processing method may be applied to the first application scenario and the second application scenario.

Application of the image processing method in the first application scenario is described below first.

In one embodiment, the image processing method also includes invoking a biometric identification component such that the image acquisition component is in a working state. The biometric identification component includes the image acquisition component. The image processing method also includes displaying an output image in the input area. The output image may be used to light a part of the light-emitting units corresponding to the input area of the display screen. Accordingly, if a finger of a user covers the input area, light emitted by the lighted light-emitting units may be reflected by the finger and then incident on the image acquisition component. For details, reference may be made to FIG. 5.

It may be understood that the input area may correspond to a plurality of light-emitting units. To save resources, based on visual inertia, a part of the plurality of light-emitting units corresponding to the input area may be lighted. To avoid affecting a display effect, different parts of the plurality of light emitting units corresponding to the input area may be controlled to emit light at different time.

In the first application scenario, there is a plurality of implementations of Step S902. The present application provides but is not limited to the following methods.

In a first implementation method, a refreshing method of the display screen is the first refreshing method. At least a part of the output image displayed on the display screen is a black area. That is, the driving signal is a lower-level signal. In this case, the image acquisition component may suspend image acquisition.

In one embodiment, the synchronization signal is a lower-level signal corresponding to a frame of output image displayed on the display screen, such that the image acquisition component in a working state may suspend image acquisition during a period of a lower-level signal corresponding to the frame of output image displayed on the display screen. During a refreshing cycle of the frame of output image, a part of the display area on the display screen corresponding to a period with the lower-level signal is in an unlighted state.

That "a part of display area on the display screen is in an unlighted state" means that the part of display area on the display screen is a black area. In one embodiment, the light-emitting element of the light-emitting layer corresponding to the part of display area is in an unlighted state, such that the part of display area is a black area.

That "a part of the display area on the display screen corresponding to a period with the lower-level signal is in an unlighted state" means that the part of the display area is always in an unlighted state during a period when the lower-level signal lasts.

In a second implementation method, the refreshing method of the display screen is the second refreshing method. When a black area in the output image displayed on the display screen overlaps and the input area 14, the image acquisition component may suspend image acquisition.

The synchronization signal is a target lower-level signal. A part of a display area corresponding to the target lower-level signal in a frame of output image displayed on the display screen at least partially overlaps the input area corresponding to the image acquisition component. Accordingly, the image acquisition component in a working state may suspend image acquisition when the part of display area corresponding to the target lower-level signal in the frame of output image displayed on the display screen at least partially overlaps the input area corresponding to the image acquisition component. During the period of lower-level signal in a refreshing cycle of the frame of output image, the part of display area on the display screen corresponding to the target lower-level signal is in an unlighted state. Positions of the parts of display areas on the display screen corresponding to the respective periods of lower-level signals of two adjacent frames of output images may be different.

In one embodiment, a position of the black area in each frame of image may be calculated according to a frequency of pulse width modulation (PWM), a duty ratio, a total number of light and dark stripes in the display screen, and a front porch and a back porch of software.

In one embodiment, the driving circuit may store the position of the input area on the display screen. The driving circuit may determine the target lower-level signal based on the position where the black area appears in each frame of image and the position of the input area on the display screen. That is, the synchronization signal is the target lower-level signal. A part of display area corresponding to the target lower-level signal in the frame of output image displayed on the display screen at least partially overlaps the input area corresponding to the image acquisition component.

Accordingly, the image acquisition component in a working state may suspend image acquisition when the part of display area corresponding to the target lower-level signal in the frame of output image displayed on the display screen at least partially overlaps the input area corresponding to the image acquisition component. During a period of lower-level signal in a refreshing cycle of the frame of output image, the part of display area on the display screen corresponding to the target lower-level signal is in an unlighted state. Positions of the parts of display areas on the display screen corresponding to the respective periods of lower-level signals of two adjacent frames of output images may be different.

In one embodiment, that "a part of display area corresponding to the target lower-level signal in the frame of output image displayed on the display screen at least partially overlaps the input area corresponding to the image acquisition component" includes that the part of display area completely overlaps the input area, or the input area is a part area of the part of display area, or the part of display area is a part area of the input area, or a part area of the input area overlaps a part area of the part of display area.

FIGS. 10a to 10d illustrate schematic diagrams of positional relationships between an input area and a black area of an output image according to some embodiments of the present disclosure. As shown in FIGS. 10a to 10d, the input area 14 is located at a region framed by a dotted line.

Figures 10A, 10B, 10C, 10D:
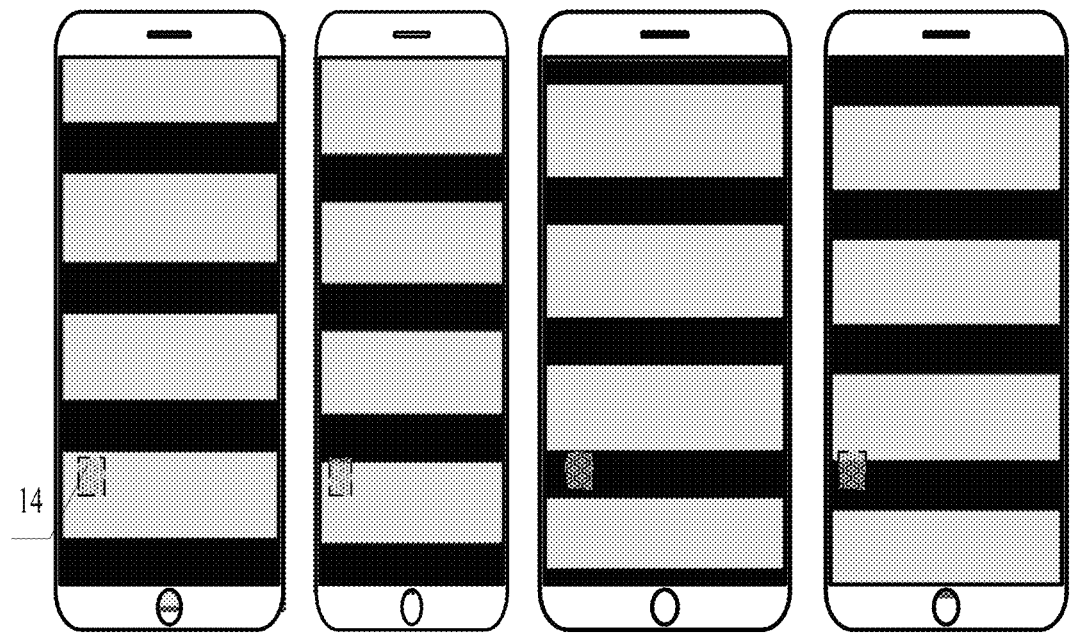
FIGS. 10a to 10d illustrate schematic diagrams of positional relationships between an input area and a black area of an output image according to some embodiments of the present disclosure.

In cases shown in FIG. 10a and FIG. 10b, the part of display area corresponding to the target lower-level signal does not intersect with the input area, and the image acquisition component may continue image acquisition. In cases shown in FIG. 10c and FIG. 10d, the input area overlaps the part of display area corresponding to the target lower-level signal, and the image acquisition component may suspend image acquisition.

In one embodiment, the part of display area corresponding to the target lower-level signal in the frame of output image displayed on the display screen means that the light-emitting element of the light-emitting layer corresponding to the part of display area is in an unlighted state, such that the part of display area is a black area.

In one embodiment, the part of display area corresponding to the target lower-level signal may refer to a black area that overlaps the input area 14 as shown in FIG. 10c and FIG. 10d.

In one embodiment, a position of the black area in each frame of output image may be calculated according to a frequency of the driving signal, a duty ratio, a total number of light and dark stripes in the display screen, and a front porch and a back porch of the software.

In one embodiment, the driving circuit may store a position of the input area on the display screen. The driving circuit may determine the target lower-level signal based on the position where the black area appears in each frame of output image and the position of the input area on the display screen. That is, the synchronization signal is the target lower-level signal.

In one embodiment of the first application scenario, after Step S902, the image processing method further includes resuming the image acquisition component for image acquisition.

In a first case, the refreshing method of the display screen is the first refreshing method. When the entire area of the output image displayed on the display screen is a non-black area, that is, the driving signal is a high-level signal, the image acquisition component may resume image acquisition.

The frame of output image displayed on the display screen correspond to a high-level signal. The image acquisition component in a working state resumes image acquisition during a period when the frame of output image displayed on the display screen corresponds to a high-level signal. During the refreshing cycle of the frame of output image, the part of display area on the display screen corresponding to a period of the high-level signal is in a lighted state.

That a part of display area on the display screen is in a lighted state means that the part of display area on the display screen is a non-black area. In one embodiment, the light-emitting element on the light-emitting layer corresponding to the part of display area may emit strong light, such that the part of display area is a non-black area.

In a second case, the refreshing method of the display screen is the second refreshing method. If a non-black area in the output image displayed on the display screen includes the input area 14, the image acquisition component may resume image acquisition.

Still referring to FIG. 10a to FIG. 10d, the non-black area of the output image in FIG. 10a to FIG. 10b completely includes the input area 14, so the image acquisition component may resume image acquisition.

In one embodiment, the image processing method provided by the present disclosure is applied to a driving circuit of a display screen. The driving circuit may monitor attribute information of a driving signal output by the driving circuit. The driving circuit may at least control the image acquisition component to suspend or resume image acquisition based on the attribute information.

In the second refreshing method of the display screen, based on the attribute information and the position of the input area 14 on the display screen, the image acquisition component may be controlled to suspend or resume image acquisition. In the first refreshing method of the display screen, based on the attribute information, the image acquisition component may be controlled to suspend image acquisition.

The attribute information may include a frequency of the driving signal, a duty ratio, a total number of light and dark stripes in the display screen, a front porch and back porch of the software.

In one embodiment, the image processing method provided by the present disclosure is applied to a processor in an electronic device. The driving circuit may send an instruction for controlling the image acquisition component to suspend or resume image acquisition to the processor, and then the processor controls the image acquisition component to continue or suspend the image acquisition.

In the first application scenario, the light emitting element may be a sensor that may collect light, for example, a CMOS sensor.

In any one of the foregoing embodiments, during a process of suspending image acquisition, the image acquisition component is still in a working state, while an operation of image acquisition is not performed.

Application of the image processing method in the second application scenario is described below.

The image processing method shown in FIG. 9 further includes controlling the input area of the display screen to be in a transparent state, such that external light may pass through the input area and enter the acquisition area of the image acquisition component. For details of this operation, reference may be made to FIG. 7.

It may be understood that if the image acquisition component collects light from the external ambient, the light-emitting element of the light-emitting layer corresponding to the input area should be in an unlighted state. If the light-emitting element corresponding to the input area is in a lighted state, collecting light from the external ambient may be difficult.

As such, to collect light of the external ambient, the image acquisition component may resume image acquisition when the light emitting element of the light emitting layer corresponding to the input area is in an unlighted state. When the light-emitting element of the light-emitting layer corresponding to the input area is in a lighted state, the image acquisition component may suspend image acquisition.

In the second application scenario, there is a plurality of implementation methods for Step S902. The present application provides but is not limited to the following methods.

In a first implementation method, the refreshing method of the display screen is the first refreshing method. When at least a part of the output image displayed on the display screen is a non-black area, that is, the driving signal is a high-level signal, the image acquisition component may suspend image acquisition.

In one embodiment, the synchronization signal is a high-level signal corresponding to a frame of output image displayed on the display screen, such that the image acquisition component in a working state may suspend image acquisition during a period of a high-level signal corresponding to the frame of output image displayed on the display screen. During a refreshing cycle of the frame of output image, the part of the display area on the display screen corresponding to the period of the high-level signal is in a lighted state.

That the part of display area on the display screen is in a lighted state means that the part of display area on the display screen is a non-black area. In one embodiment, the light-emitting element of the light-emitting layer corresponding to the part of display area is lighted, such that the part of display area is a non-black area.

That the part of the display area on the display screen corresponding to the period of the high-level signal is in a lighted state means that the part of display area is always in a lighted state during the period when the high-level signal lasts.

In a second implementation method, the refreshing method of the display screen is the second refreshing method. When the non-black area in the output image displayed on the display screen overlaps the input area 14, the image acquisition component may suspend image acquisition.

The synchronization signal is a target high-level signal. A part of display area corresponding to the target high-level signal in a frame of output image displayed on the display screen at least partially overlaps the input area corresponding to the image acquisition component. Accordingly, the image acquisition component in a working state may suspend image acquisition when the part of display area corresponding to the target high-level signal in the frame of output image displayed on the display screen at least partially overlaps the input area corresponding to the image acquisition component. During a period of high-level signal in a refreshing cycle of the frame of output image, the part of display area on the display screen corresponding to the period of the target lower-level signal is in lighted state. Positions of the parts of display areas on the display screen corresponding to the respective periods of high-level signals of two adjacent frames of output images may be different.

In one embodiment, a position of the non-black area in each frame of image may be calculated according to a frequency of pulse width modulation (PWM), a duty ratio, a total number of light and dark stripes in the display screen, and a front porch and a back porch of the software.

In one embodiment, the driving circuit may store a position of the input area on the display screen. The driving circuit may determine the target high-level signal based on the position where the non-black area appears in each frame of image and the position of the input area on the display screen. That is, the synchronization signal is the target high-level signal. A part of display area corresponding to the target high-level signal in a frame of output image displayed on the display screen at least partially overlaps the input area corresponding to the image acquisition component.

Accordingly, the image acquisition component in a working state may suspend image acquisition when the part of display area corresponding to the target high-level signal in the frame of output image displayed on the display screen at least partially overlaps the input area corresponding to the image acquisition component. During a period of high-level signal in a refreshing cycle of the frame of output image, a part of display area on the display screen corresponding to the period of the target lower-level signal is in lighted state. Positions of the parts of display areas on the display screen corresponding to the respective periods of high-level signals of two adjacent frames of output images may be different.

In one embodiment, that "a part of display area corresponding to the target high-level signal in a frame of output image displayed on the display screen at least partially overlaps the input area corresponding to the image acquisition component" includes that the part of display area corresponding to the target high-level signal completely overlaps the input area, or the input area is a part of the part of display area corresponding to the target high-level signal, or the part of display area corresponding to the target high-level signal is a part of the input area, or a part of the input area overlaps a part of the part of display area corresponding to the target high-level signal.

FIGS. 10a to 10d illustrate schematic diagrams of positional relationships between an input area and a black area of an output image according to some embodiments of the present disclosure. As shown in FIGS. 10a to 10d, the input area 14 is located at a region framed by a dotted line.

In cases shown in FIG. 10a, FIG. 10b, and FIG. 10d, the part of display area corresponding to the target high-level signal overlaps the input area, and the image acquisition component may suspend image acquisition. In a case shown in FIG. 10c, the input area does not intersect with the part of display area corresponding to the target high-level signal, and the image acquisition component may resume image acquisition.

The part of display area corresponding to the target high-level signal in a frame of the output image displayed on the display screen means that the light-emitting element of the light-emitting layer corresponding to the part of display area corresponding to the target high-level signal is in a lighted state, such that the part of display area is a non-black area.

In one embodiment, a position where the non-black area appears in each frame of output image may be calculated according to a frequency of the driving signal, a duty ratio, a total number of light and dark stripes in the display screen, and a front porch and a back porch of the software.

In one embodiment, the driving circuit may store the position of the input area on the display screen. The driving circuit may determine the target high-level signal based on the position where the non-black area appears in each frame of image and the position of the input area on the display screen. That is, the synchronization signal is the target high-level signal.

In one embodiment of the second application scenario, after Step S902, the image processing method further includes resuming the image acquisition component for image acquisition.

In a first case, the refreshing method of the display screen is the first refreshing method. When the entire area of the output image displayed on the display screen is a black area, that is, the driving signal is a lower-level signal, the image acquisition component may resume image acquisition.

The frame of output image displayed on the display screen may correspond to a lower-level signal. The image acquisition component in a working state may resume image acquisition during a period when the frame of output image displayed on the display screen corresponds to a lower-level signal. During a refreshing cycle of the frame of output image, the part of the display area on the display screen corresponding to the period of lower-level signal is in an unlighted state.

That the part of the display area on the display screen is in an unlighted state means that the part of the display area on the display screen is a black area. In one embodiment, the light-emitting element on the light-emitting layer corresponding to the part of the display area is in an unlighted state, that is, the light-emitting element does not emit light.

In a second case, the refreshing method of the display screen is the second refreshing method. If the black area in the output image displayed on the display screen includes the input area 14, the image acquisition component may resume image acquisition.

Still referring to FIG. 10a to FIG. 10d, the black area of the output image in FIG. 10c completely includes the input area 14, and thus the image acquisition component may resume image acquisition.

In one embodiment, the image processing method provided by the present disclosure is applied to a driving circuit of a display screen. The driving circuit may monitor attribute information of a driving signal output by the driving circuit. The driving circuit may at least control the image acquisition component to suspend image acquisition based on the attribute information.

In the second refreshing method of the display screen, based on the attribute information and the position of the input area 14 on the display screen, the image acquisition component may be controlled to suspend or resume image acquisition. In the first refreshing method of the display screen, based on the attribute information, the image acquisition component may be controlled to suspend or resume image acquisition.

The attribute information may include a frequency of the driving signal, a duty ratio, a total number of light and dark stripes in the display screen, a front porch and back porch of the software.

In one embodiment, the image processing method provided by the present disclosure is applied to a processor in an electronic device. The driving circuit may send an instruction for controlling the image acquisition component to suspend or resume image acquisition to the processor, and then the processor may control the image acquisition component to continue or suspend the image acquisition.

In the first application scenario, the light emitting element may be a sensor that may collect light, for example, a CMOS sensor.

In any one of the foregoing embodiments, during a process of suspending image acquisition, the image acquisition component is still in a working state, while an operation of image acquisition is not performed.

The image processing method provided by the present disclosure is described in detail in the above embodiments. The image processing method may be implemented through various forms of devices. The present disclosure also provides an electronic device, and specific embodiments are given below for detailed description.

Figure 11:
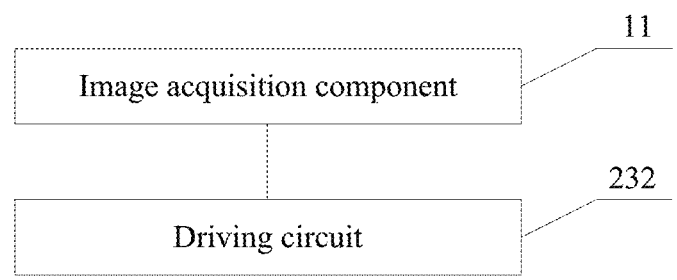
FIG. 11 illustrates a structural diagram of an implementation of an electronic device according to some embodiments of the present disclosure.

FIG. 11 illustrates a structural diagram of an implementation of an electronic device according to some embodiments of the present disclosure. As shown in FIG. 11, the electronic device includes an image acquisition component 11 and a driving circuit 232 (or a processor). The image acquisition component 11 may be used for image acquisition. The driving circuit 232 or a processor may be used to suspend the image acquisition component from image acquisition based on a synchronization signal.

The image acquisition component and the display screen may be arranged in a stacked way. The image acquisition component includes an acquisition area. The acquisition area corresponds to an input area on a display area of the display screen. The synchronization signal is at least synchronized with a signal of brightness decrease of an input area on the display area of the display screen, corresponding to the acquisition area.

In one embodiment, each of the driving circuit 232 and the image acquisition component 11 reserves a general-purpose input output (GPIO) interface for transmitting the synchronization signal.

Figure 12:
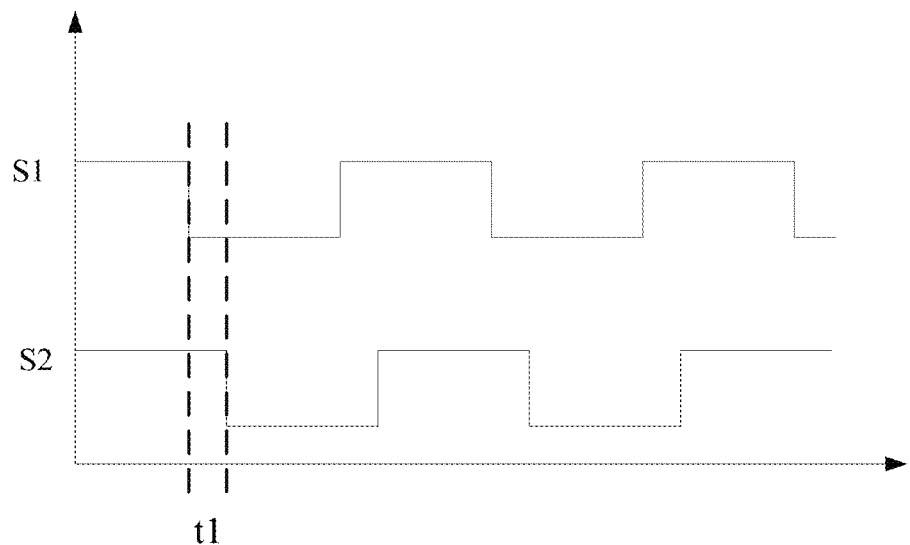
FIG. 12 illustrates a schematic diagram of a relationship between a synchronization signal S1 and a signal S2 representing actual suspending and resuming of an image acquisition component in a first application scenario.

FIG. 12 illustrates a schematic diagram of a relationship between a synchronization signal S1 and a signal S2 representing actual suspending and resuming of an image acquisition component in a first application scenario. As shown in FIG. 12, when the synchronization signal S1 is at a high level, the input area of the display screen is located at a non-black area. When the synchronization signal is at a low level, at least a part of the input area on the display screen is a black area.

In one embodiment, the driving circuit may include a scan register. The scan register may store the signal S2 representing actual suspending and resuming image acquisition of the image acquisition component 11

As shown in FIG. 12, compared to the signal S1, the signal S2 may have a certain delay. The delay of the second signal S2 is because after the driving circuit sends a synchronization signal to the image acquisition component, the image acquisition component may respond to the synchronization signal in a certain time. Accordingly, actual time of suspending or resuming image acquisition based on the synchronization signal may be delayed relative to the synchronization signal.

For example, if the image acquisition component detects that the synchronization signal S1 is at a low level, the image acquisition component may suspend the image acquisition. Since the image acquisition component needs a certain time to respond, the image acquisition may be suspended after a certain time. That is, within a short time (that is, time t1), images may still be acquired when at least a part of the input area is a black area. Compared with a conventional technology that acquire images during an entire lower-level period, images acquired by the method provided by the present disclosure does not have light and dark stripes or the light and dark stripes are not obvious.

If the image acquisition component detects that the synchronization signal S1 is at a high level, the image acquisition component may resume image acquisition. Since the image acquisition component needs a certain time to respond, the image acquisition may be resumed after a certain time.

Figure 13:
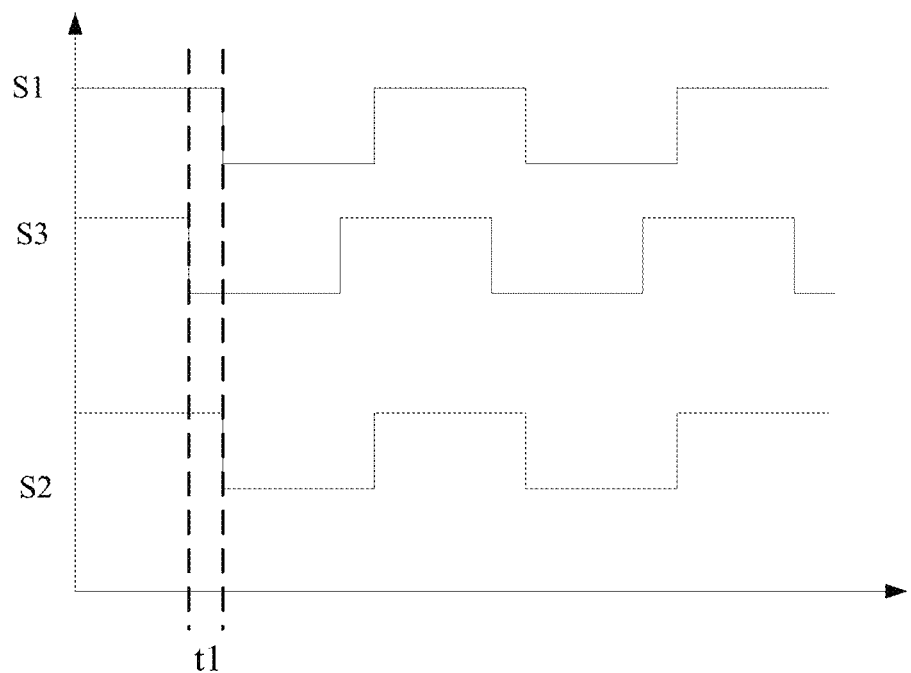
FIG. 13 illustrates a schematic diagram showing relationships between an original synchronization signal S1, an adjusted synchronization signal S3, and the signal S2.

Since the image acquisition component needs a certain time to respond, within a short time (that is, time t1), images may still be acquired when at least a part of the input area is a black area. To avoid this phenomenon, the driving circuit may determine the synchronization signal based on a response time of the image acquisition component. FIG. 13 illustrates a schematic diagram showing relationships between an original synchronization signal S1, an adjusted synchronization signal S3, and the signal S2.

The driving circuit may send the adjusted synchronization signal S3 to the image acquisition component. After the image acquisition component responds for a certain time, the original synchronization signal S1 reaches a falling edge. As such, the phenomenon may not appear that in a short time (that is, time t1) the image acquisition component may acquire images when at least a part of the input area is a black area.

In the second application scenario, the relationships between the original synchronization signal S1, the synchronization signal S2, and the adjusted signal S3 may be reversed, and details are not described here.

In one embodiment, the synchronization signal is a lower-level signal corresponding to a frame of output image displayed on the display screen, such that the image acquisition component in a working state may suspend image acquisition during a period of a lower-level signal corresponding to the frame of output image displayed on the display screen. During a refreshing cycle of the frame of output image, the part of the display area on the display screen corresponding to the period of the lower-level signal is in an unlighted state.

In one embodiment, the synchronization signal is a target lower-level signal. The part of display area corresponding to the target lower-level signal in the frame of output image displayed on the display screen at least partially overlaps the input area corresponding to the image acquisition component. Accordingly, the image acquisition component in a working state may suspend image acquisition when the part of the display area corresponding to the target lower-level signal in the frame of output image displayed on the display screen at least partially overlaps the input area corresponding to the image acquisition component. During a period of lower-level signal in a refreshing cycle of the frame of output image, the part of display area on the display screen corresponding to the period of the target lower-level signal is in an unlighted state. Positions of the parts of display areas on the display screen corresponding to the respective periods of lower-level signals of two adjacent frames of output images may be different.

In one embodiment, the driving circuit 232 or the processor may also be used to resume the image acquisition component for image acquisition.

In one embodiment, the driving circuit 232 or the processor may also be used to invoke a biometric identification component such that the image acquisition component is in a working state. The biometric identification component includes the image acquisition component. An output image is displayed in the input area. The output image may be used to light a part of the light-emitting unit corresponding to the input area of the display screen. Accordingly, if a finger of a user covers the input area, light emitted by the lighted light-emitting unit may be reflected by the finger and then incident on the image acquisition component.

In one embodiment, the driving circuit 232 or the processor may also be used to control the input area of the display screen to be in a transparent state, such that external light may pass through the input area and enters the acquisition area of the image acquisition component.

The synchronization signal is a high-level signal corresponding to the frame of output image displayed on the display screen, such that the image acquisition component in a working state may suspend image acquisition during a period of the high-level signal corresponding to the frame of output image displayed on the display screen. During a refreshing cycle of the frame of output image, the part of the display area on the display screen corresponding to the period of the high-level signal is in a lighted state.

In one embodiment, the driving circuit 232 or the processor may also be used to control the input area of the display screen to be in a transparent state, such that external light may pass through the input area and enters the acquisition area of the image acquisition component. The synchronization signal is the target high-level signal.

A part of display area corresponding to the target high-level signal in a frame of output image displayed on the display screen at least partially overlaps the input area corresponding to the image acquisition component.

Accordingly, the image acquisition component in a working state may suspend image acquisition when the part of display area corresponding to the target high-level signal in the frame of output image displayed on the display screen at least partially overlaps the input area corresponding to the image acquisition component. During a period of high-level signal in a refreshing cycle of the frame of output image, the part of display area on the display screen corresponding to the target high-level signal is in lighted state. Positions of the parts of display areas on the display screen corresponding to the respective periods of high-level signals of two adjacent frames of output images may be different.

The present disclosure also provides a readable storage medium stored with a computer program. When the computer program is executed by a processor, each step included in the image processing method provided by the present disclosure may be implemented.

As disclosed, the technical solutions of the present disclosure have the following advantages.

The present disclosure provides an image processing method. During a process of image acquisition, an image acquisition component may suspend image acquisition based on a synchronization signal. The image acquisition component and a display screen are arranged in a stacked way. The image acquisition component includes an acquisition area, and the acquisition area corresponds to an input area on a display area of the display screen. The synchronization signal is at least synchronized with a signal at which brightness of the input area, corresponding to the acquisition area, on the display area of the display screen is reduced. In summary, when the brightness of the input area changes, image acquisition may be suspended. That is, images may be acquired only when the brightness of the input area is consistent. As such, brightness values of acquired images may be consistent, and there may be no inconsistent brightness, that is, no bright and dark stripes, in the acquired images.

It should be noted that in the present disclosure, relational terms such as "first" and "second" are used only to distinguish one entity or operation from another entity or operation, and do not necessarily require or imply that there is any such actual relationship or order between these entities or operations. Moreover, terms "including", "comprising", or any other variation thereof refer to non-exclusive inclusion. A process, method, article, or device including a series of elements includes not only those elements but also other elements that are not explicitly listed or elements that are inherent to this process, method, article, or device. Without more restrictions, elements defined by a sentence "including a . . . " do not exclude existence of other identical elements in a process, method, article, or device including the elements.

Steps of a method or algorithm described in the present disclosure may be implemented by hardware, a software module executed by a processor, or a combination of the two. The software module may be stored in a random-access memory (RAM), internal memory, read-only memory (ROM), electrically programmable ROM, electrically erasable programmable ROM, register, hard disk, removable disk, CD-ROM, or any other form of readable storage medium known in the art.

The embodiments disclosed in the present disclosure are example only and not limiting the scope of the present disclosure. Various combinations, alternations, modifications, or equivalents to the technical solutions of the disclosed embodiments can be obvious to those skilled in the art and can be included in the present disclosure. Without departing from the spirit of the present disclosure, the technical solutions of the present disclosure may be implemented by other embodiments, and such other embodiments are intended to be encompassed within the scope of the present disclosure.

What is claimed is:

1. A method, comprising:
   acquiring an image through an image acquisition component, wherein:
   the image acquisition component and a display screen are arranged one over another, and
   the image acquisition component includes an acquisition area, and the acquisition area corresponds to an input area on a display area of the display screen;
   based on a synchronization signal that is at least synchronized with a signal of brightness decrease of the input area on the display area of the display screen, suspending image acquisition of the image acquisition component;
   resuming the image acquisition of the image acquisition component;
   calling a biometric identification component such that the image acquisition component is in a working state, wherein the biometric identification component includes the image acquisition component; and
   displaying a frame of an output image in the input area, wherein the frame of output image is used to light a part of the light-emitting units corresponding to the input area of the display screen, such that, in response to a finger of a user covering the input area, light emitted by the lighted light-emitting units is reflected by the finger and then incident on the image acquisition component.

2. The method according to claim 1, wherein:
   the synchronization signal is a lower-level signal corresponding to a frame of an output image displayed on the display screen, such that the image acquisition component in a working state suspends the image acquisition during a period of the lower-level signal corresponding to the frame of the output image displayed on the display screen, wherein:
   in a refreshing cycle of the frame of the output image, a part of the display area on the display screen corresponding to the period of the lower-level signal is in an unlighted state.

3. The method according to claim 1, wherein:
   the synchronization signal is a target lower-level signal, wherein:
   a part of the display area corresponding to the target lower-level signal in a frame of an output image displayed on the display screen at least partially overlaps the input area corresponding to the image acquisition component, wherein:
   the image acquisition component in a working state suspends the image acquisition when the part of the display area corresponding to the target lower-level signal in the frame of output image displayed on the display screen at least partially overlaps the input area corresponding to the image acquisition component, wherein
   during a period of a lower-level signal in a refreshing cycle of the frame of output image, the part of the display area on the display screen corresponding to the target lower-level signal is in an unlighted state, and parts of the display areas corresponding to respective periods of the lower-level signals of two adjacent frames of output images have different positions on the display screen.

4. The method according to claim 1, further comprising:

controlling the input area of the display screen to be in a transparent state, such that external light passes through the input area and is incident on the acquisition area of the image acquisition component, the synchronization signal being a high-level signal corresponding to a frame of an output image displayed on the display screen, such that the image acquisition component in a working state suspends the image acquisition during a period of the high-level signal corresponding to the frame of output image displayed on the display screen, wherein:

in a refreshing cycle of the frame of output image, a part of the display area on the display screen corresponding to the period of the high-level signal is in a lighted state.

5. The method according to claim 1, further comprising:

controlling the input area of the display screen to be in a transparent state, such that external light passes through the input area and is incident on the acquisition area of the image acquisition component, the synchronization signal being a target high-level signal, wherein:

a part of the display area corresponding to the target high-level signal in a frame of output image displayed on the display screen at least partially overlaps the input area corresponding to the image acquisition component, such that the image acquisition component in a working state suspends the image acquisition when the part of the display area corresponding to the target high-level signal in the frame of the output image displayed on the display screen at least partially overlaps the input area corresponding to the image acquisition component, wherein:

during a period of a high-level signal in a refreshing cycle of the frame of the output image, the part of the display area on the display screen corresponding to the target high-level signal is in a lighted state; and parts of the display areas on the display screen corresponding to the respective periods of the high-level signal of two adjacent frames of output images have different positions on the display screen.

6. An electronic device, comprising:

a memory, storing program instructions; and a processor, coupled to the memory and, when the program instructions being executed, configured to:

acquire an image through an image acquisition component, wherein:

the image acquisition component and a display screen are arranged one over another, and the image acquisition component includes an acquisition area, and the acquisition area corresponds to an input area on a display area of the display screen; and based on a synchronization signal that is at least synchronized with a signal of brightness decrease of the input area on the display area of the display screen, suspend image acquisition of the image acquisition component;

resume the image acquisition of the image acquisition component;

call a biometric identification component such that the image acquisition component is in a working state, wherein the biometric identification component includes the image acquisition component; and display a frame of an output image in the input area, wherein the frame of output image is used to light a part of the light-emitting units corresponding to the input area of the display screen, such that, in response to a finger of a user covering the input area, light emitted by the lighted light-emitting units is reflected by the finger and then incident on the image acquisition component.

7. The device according to claim 6, wherein:

the synchronization signal is a lower-level signal corresponding to a frame of an output image displayed on the display screen, such that the image acquisition component in a working state suspends the image acquisition during a period of the lower-level signal corresponding to the frame of the output image displayed on the display screen, wherein:

in a refreshing cycle of the frame of the output image, a part of the display area on the display screen corresponding to the period of the lower-level signal is in an unlighted state.

8. The device according to claim 6, wherein:

the synchronization signal is a target lower-level signal, wherein:

a part of the display area corresponding to the target lower-level signal in a frame of an output image displayed on the display screen at least partially overlaps the input area corresponding to the image acquisition component, wherein:

the image acquisition component in a working state suspends the image acquisition when the part of the display area corresponding to the target lower-level signal in the frame of output image displayed on the display screen at least partially overlaps the input area corresponding to the image acquisition component, wherein during a period of a lower-level signal in a refreshing cycle of the frame of output image, the part of the display area on the display screen corresponding to the target lower-level signal is in an unlighted state, and parts of the display areas corresponding to respective periods of the lower-level signals of two adjacent frames of output images have different positions on the display screen.

9. The device according to claim 6, wherein the processor is further configured to:

control the input area of the display screen to be in a transparent state, such that external light passes through the input area and is incident on the acquisition area of the image acquisition component, the synchronization signal being a high-level signal corresponding to a frame of an output image displayed on the display screen, such that the image acquisition component in a working state suspends the image acquisition during a period of the high-level signal corresponding to the frame of output image displayed on the display screen, wherein:

in a refreshing cycle of the frame of output image, a part of the display area on the display screen corresponding to the period of the high-level signal is in a lighted state.

10. The device according to claim 6, wherein the processor is further configured to:

control the input area of the display screen to be in a transparent state, such that external light passes through the input area and is incident on the acquisition area of the image acquisition component, the synchronization signal being a target high-level signal, wherein:
a part of the display area corresponding to the target high-level signal in a frame of output image displayed on the display screen at least partially overlaps the input area corresponding to the image acquisition component, such that the image acquisition component in a working state suspends the image acquisition when the part of the display area corresponding to the target high-level signal in the frame of the output image displayed on the display screen at least partially overlaps the input area corresponding to the image acquisition component, wherein:
    during a period of a high-level signal in a refreshing cycle of the frame of the output image, the part of the display area on the display screen corresponding to the target high-level signal is in a lighted state; and
    parts of the display areas on the display screen corresponding to the respective periods of the high-level signal of two adjacent frames of output images have different positions on the display screen.

11. A non-transitory computer readable storage medium, containing program instructions and configured, when the program instructions being executed, for a computer to perform a method, the method comprising:
acquiring an image through an image acquisition component, wherein:
    the image acquisition component and a display screen are arranged one over another, and
    the image acquisition component includes an acquisition area, and the acquisition area corresponds to an input area on a display area of the display screen; and
suspending image acquisition of the image acquisition component based on a synchronization signal which is a lower-level signal corresponding to a frame of an output image displayed on the display screen that is at least synchronized with a signal of brightness decrease of the input area on the display area of the display screen, including making a part of the display area on the display screen to be in an unlighted state in a refreshing cycle of the frame of the output image corresponding to the period of the lower-level signal.

12. The storage medium according to claim 11, wherein:
the synchronization signal is a target lower-level signal, wherein:
a part of the display area corresponding to the target lower-level signal in a frame of an output image displayed on the display screen at least partially overlaps the input area corresponding to the image acquisition component, wherein:
the image acquisition component in a working state suspends the image acquisition when the part of the display area corresponding to the target lower-level signal in the frame of output image displayed on the display screen at least partially overlaps the input area corresponding to the image acquisition component, wherein
    during a period of a lower-level signal in a refreshing cycle of the frame of output image, the part of the display area on the display screen corresponding to the target lower-level signal is in an unlighted state, and
    parts of the display areas corresponding to respective periods of the lower-level signals of two adjacent frames of output images have different positions on the display screen.

13. The storage medium according to claim 11, wherein the method further comprises:
resuming the image acquisition of the image acquisition component.

14. The method according to claim 13, wherein the method further comprises:
calling a biometric identification component such that the image acquisition component is in a working state, wherein the biometric identification component includes the image acquisition component; and
displaying a frame of an output image in the input area, wherein the frame of output image is used to light a part of the light-emitting units corresponding to the input area of the display screen, such that, in response to a finger of a user covering the input area, light emitted by the lighted light-emitting units is reflected by the finger and then incident on the image acquisition component.

15. The method according to claim 11, wherein the method further comprises:
controlling the input area of the display screen to be in a transparent state, such that external light passes through the input area and is incident on the acquisition area of the image acquisition component,
the synchronization signal being a high-level signal corresponding to a frame of an output image displayed on the display screen, such that the image acquisition component in a working state suspends the image acquisition during a period of the high-level signal corresponding to the frame of output image displayed on the display screen, wherein:
in a refreshing cycle of the frame of output image, a part of the display area on the display screen corresponding to the period of the high-level signal is in a lighted state.

* * * * *